United States Patent
Xhafa

(10) Patent No.: US 7,957,362 B2
(45) Date of Patent: Jun. 7, 2011

(54) SYSTEM AND METHOD OF COMMUNICATION IN MESH NETWORKS

(75) Inventor: Ariton Xhafa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 11/445,842

(22) Filed: Jun. 1, 2006

(65) Prior Publication Data

US 2007/0002820 A1  Jan. 4, 2007

Related U.S. Application Data

(60) Provisional application No. 60/686,277, filed on Jun. 1, 2005.

(51) Int. Cl.
*H04B 7/212* (2006.01)

(52) U.S. Cl. ...... 370/348; 370/328; 370/338; 455/193.1

(58) Field of Classification Search .................. 370/445, 370/238, 330, 310, 400, 338; 455/446, 193.1
See application file for complete search history.

(56) References Cited

U.S. PATENT DOCUMENTS

| | | | | |
|---|---|---|---|---|
| 6,426,814 B1 * | 7/2002 | Berger et al. | ............... | 398/45 |
| 6,724,730 B1 * | 4/2004 | Mlinarsky et al. | ............ | 370/241 |
| 6,850,502 B1 * | 2/2005 | Kagan et al. | ................... | 370/330 |
| 6,947,768 B2 * | 9/2005 | Adachi et al. | ................. | 455/560 |
| 7,075,902 B2 * | 7/2006 | El Batt | ........................ | 370/310 |
| 7,333,511 B2 * | 2/2008 | Sandstrom | ..................... | 370/468 |
| 2004/0114546 A1 * | 6/2004 | Seshadri et al. | ............ | 370/310.2 |
| 2004/0264379 A1 * | 12/2004 | Srikrishna et al. | ............ | 370/238 |
| 2005/0058151 A1 * | 3/2005 | Yeh | ............................... | 370/445 |
| 2005/0094585 A1 * | 5/2005 | Golden et al. | ................. | 370/310 |
| 2006/0056421 A1 * | 3/2006 | Zaki | ............................... | 370/400 |
| 2007/0054670 A1 * | 3/2007 | Kalika et al. | ................... | 455/446 |

* cited by examiner

*Primary Examiner* — Lester Kincaid
*Assistant Examiner* — Isaak R Jama
(74) *Attorney, Agent, or Firm* — Steven A. Shaw; W. James Brady; Frederick J. Telecky, Jr.

(57) ABSTRACT

A network node is provided that includes a transceiver and a component. The transceiver is operable for communication of messages having a broadcast portion and a beamformed data portion. The broadcast portion includes an indicator. The component is operable to promote the transceiver being enabled for communication with other network nodes, in response to the message including the indicator and further in response to the message being intended for a specific network node other than the network node. The component is operable to promote the transceiver receiving the data portion of the message, in response to the message including the indicator and the message being intended for the network node.

9 Claims, 4 Drawing Sheets

SYSTEM AND METHOD OF COMMUNICATION IN MESH NETWORKS

CROSS-REFERENCE TO RELATED APPLICATIONS

This application claims the benefit of U.S. Provisional Patent Application No. 60/686,277, entitled "Innovative Approach to Increase Efficiency in Mesh Networks" filed on Jun. 1, 2005, Ariton Xhafa inventor, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless networks, and more particularly, but not by way of limitation, to a method and system for transmitting and receiving network traffic through a wireless network.

BACKGROUND OF THE INVENTION

The ability to access high speed and high performance data networks is becoming increasingly important to data clients. Wireless network access is needed in many areas where wired infrastructure is non-existent, outdated, or impractical. In some environments, fixed wireless broadband networks can perform this function. However, the effectiveness of fixed wireless broadband technology is limited due to a combination of technological constraints and high deployment costs. For example, each conventional Wireless Local Area Network (WLAN) technology access point must be connected directly to a wired backbone infrastructure.

To address the problem of access point tethering, mesh networks have been studied as an alternative. However, the effectiveness of wireless mesh networking is severely limited. In its most basic form, the mesh network is limited by its network capacity due to the requirement that nodes forward each others' packets. The mesh network is also limited by the fact that the sending and receiving of information from one mesh point to another often can cause collisions of network traffic. These collisions are sometimes minimized by the use of delays in network data, but these delays create inefficiencies within the network.

In a mesh network this inefficiency is magnified by the number of mesh nodes and access points. If there are multiple nodes within range of each other and one node signals that a delay is required by all other nodes, the one node may literally "clog" the entire mesh network. A system and method are needed to make the transfer of data within a mesh network more efficient.

SUMMARY OF THE INVENTION

In one embodiment, a network node is provided that includes a transceiver and a component. The transceiver is operable for communication of messages having a broadcast portion and a beamformed portion. The broadcast portion includes an indicator. The component is operable to promote the transceiver being enabled for communication with other network nodes, in response to the message including the indicator and further in response to the message being intended for a specific network node other than the network node. The component is operable to promote the transceiver receiving the beamformed data portion of the message, in response to the message including the indicator and the message being intended for the network node.

According to another embodiment, a method is provided for communication in a wireless network. The method includes a first node sending a broadcast portion of a message to communicate with a second node. The method includes a third node receiving the broadcast portion of the message. The method includes transmitting a beamformed data portion of the message from the first node to the second node. The method also includes the third node communicating with another node in the wireless network during transmission of the beamformed data portion of the message between the first and second nodes.

In still other embodiments, a component is provided that is used by a wireless point in a mesh network. The component includes logic that is operable to determine whether, based on a broadcast portion of a wireless message, the message is intended for the wireless point. Where the wireless message is not intended for the wireless point, the logic promotes enabling communication between the wireless point and other wireless network nodes in the mesh network during a data portion of the wireless message.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The present disclosure, in one embodiment, provides a system and method for communication in a mesh network. In one embodiment, Network Allocation Vector (NAV) and Mesh Network Allocation Vector (M-NAV) information are transmitted with request to send (RTS) broadcast messages and clear to send (CTS) broadcast messages. This portion of a message may also be referred to as a broadcast portion of the message. All access point (AP) nodes and mesh point (MP) nodes within a particular area can receive and decode the RTS and CTS messages. Thereafter, a beamformed data portion of the message is communicated between at least two points in the mesh network. According to the present disclosure, when a particular MP or AP node is not a party to the transmission, the particular MP node or AP node may engage in communication with other MP or AP nodes during the data portion of the message, such as after the M-NAV data with the RTS message is received. In some embodiments, the transmission between the AP nodes and MP nodes may use beamforming to enhance efficiency in mesh networks. Through the use of M-NAV information, selective beamforming using M-NAV information, and other aspects presently disclosed, the efficiency within mesh networks can be enhanced. The present disclosure enhancement may be by allowing an MP and/or AP node that is not part of a particular communication to engage in communication with other nodes during the beamformed data portion of the particular communication.

Figure 1:
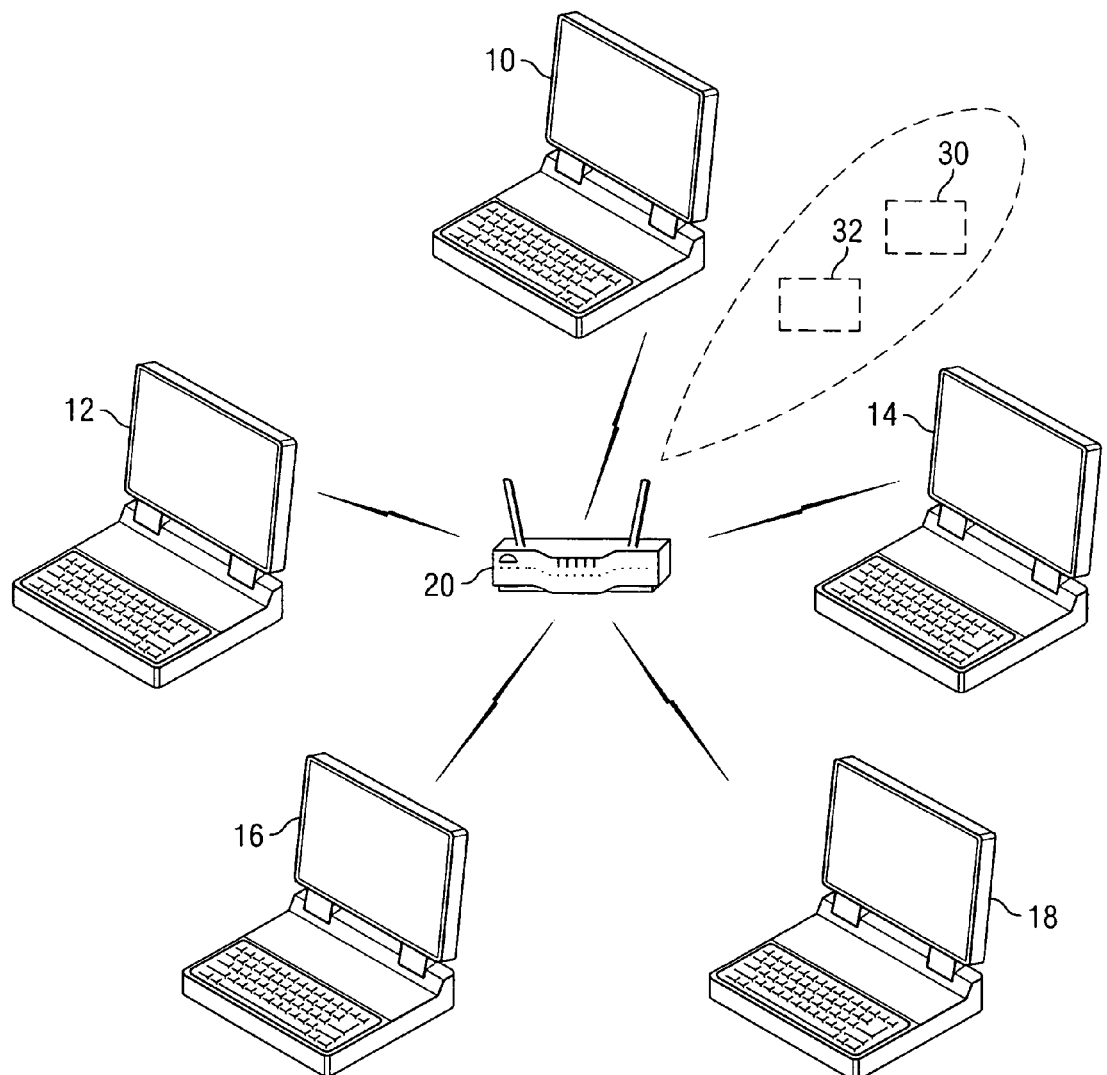
FIG. 1 illustrates one embodiment of the present disclosure.

FIG. 1 is an illustration of one embodiment of the present disclosure. In this embodiment, MP nodes 10, 12, 14, 16, 18 are within range of the AP node 20. Although MP nodes 10, 12, 14, 16, 18 are show as laptop computers and AP node 20 is shown as a wireless router, these components may be mesh points, access points, combination mesh/access points, computers, laptop computers, portable computers, servers, routers, mobile handsets, or combinations of these systems, or other systems associated with mesh or access points, or other components commonly deployed in mesh network. AP 20 includes a transceiver 30 capable of wirelessly sending and receiving data packets and a component 32. Component 32 includes logic which may include or be implemented using one or more processors, circuitry, software, firmware, or systems capable of processing data, instructions, and/or rules or protocols for communication. Although only AP 20 is shown with the transceiver 30 and component 32, these systems may also be on one or more of the MP Nodes 10, 12, 14, 16, and 18. MP nodes 10, 12, 14, 16, and 18 are also capable of direct communications within the mesh network with any other MP node within the mesh network. When MP node 10 requests a data session with AP node 20, all other MP nodes hear and understand this request. In order to avoid data interference and collisions, typically all other MP nodes would be silent during the RTS/CTS messaging, and during the data session between MP node 10 and AP node 20. One of the innovative features of the present disclosure is allowing other MP nodes within the network, for example MP nodes 12, 14, 16, and 18, to begin to carry out data transmissions which do not create interference with the data transmissions between MP node 10 and AP node 20 during the beamformed transmissions between MP node 10 and AP node 20. By allowing these transmissions, the efficiency can be greatly enhanced in the wireless network.

Figure 2:
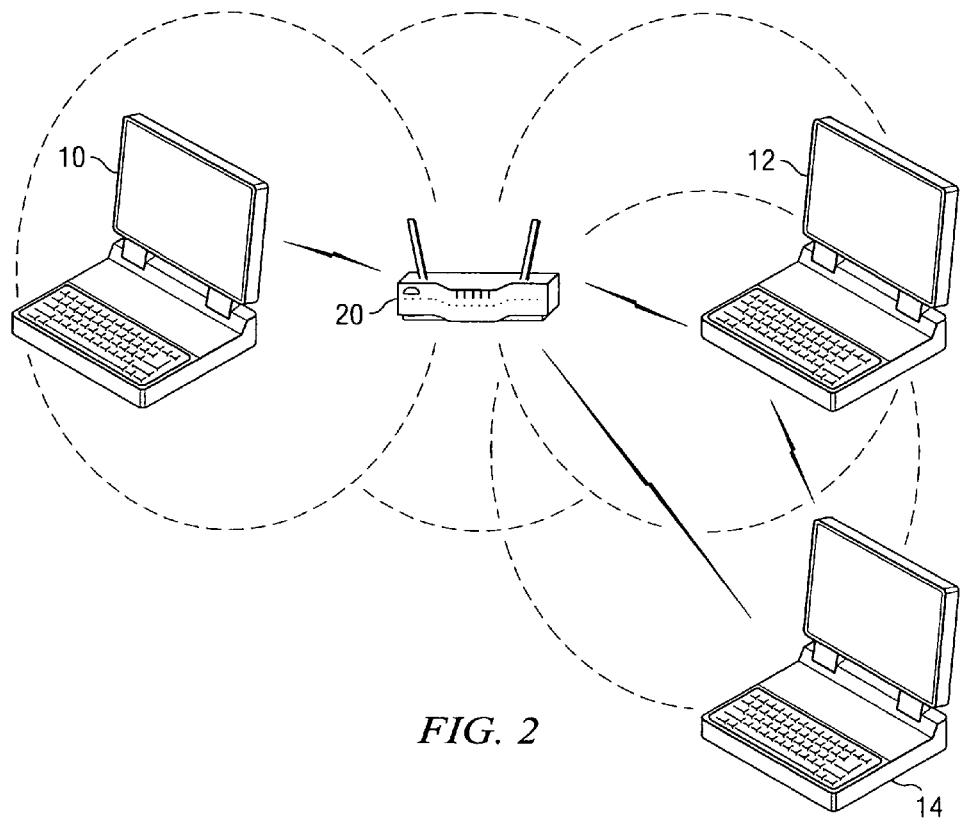
FIG. 2 shows a configuration where MP nodes are not within the effective range of each other.

While in FIG. 1 each of the MP nodes are within each others effective range, FIG. 2 shows a configuration where selected MP nodes are not within the effective range of each.

The configuration shown in FIG. 2 is often present in a mesh network and results in the hidden node problem. In this example, each MP node is within communication range of the AP node; however, not every MP node can communicate with every other MP node. For example, it is likely that MP node 10 at the far edge of the circle can see the AP node 20, but it is unlikely that MP node 10 can see or communicate with MP node 12 or 14. MP nodes 10 and 12 and 10 and 14 are known as hidden nodes because MP node 10 is not within the effective range of MP node 12 and/or 14 and vise versa. The hidden terminal or node problem is present when MP nodes 10 and 12 or MP nodes 10 and 14 start to send packets simultaneously to the AP 20, which results in collision and data interference.

In order to address this problem, a node wishing to send data initiates the process by sending an RTS message, also referred to as an RTS frame. The destination node replies with a CTS message. Any other node receiving the CTS message, also referred to as a CTS frame, will refrain from sending data for a given time. The amount of time that each node should wait before trying to send a signal is included in both the RTS and the CTS frame. While this addresses the hidden node problem, it creates a significant level of inefficiency within the wireless network. In a mesh network, where multiple MP and AP nodes are present and transmitting and receiving data simultaneously, this inefficiency is exponentially increased. It should be noted that the combination of the RTS and CTS message are referred to as a RTS/CTS message, RTS/CTS frame, or RTS/CTS frame set.

Figure 3:
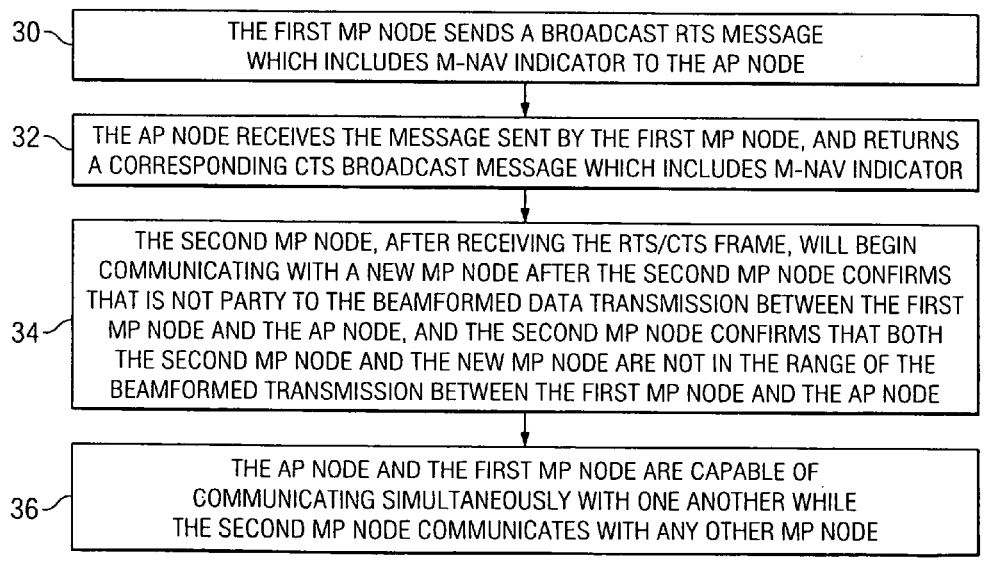
FIG. 3 is a flowchart of the process of communications between an access point node and a first mesh point node and a second mesh point node.

In one embodiment, M-NAV data is used as part of the RTS/CTS frame. This allows AP nodes and MP nodes that are not taking part in communication to avoid waiting the duration specified in the RTS/CTS frame prior to commencing communication. FIG. 3 is a flow chart illustrating a process of communications between AP node 20 and the first MP node 10 and the second MP node 12. The first MP node 10 sends a broadcast RTS message which includes M-NAV indicator to AP node 20 (Block 30). AP node 20 receives the message sent by the first MP 10, and returns a corresponding CTS broadcast message which includes M-NAV indicator (Block 32). The M-NAV indicator, in some embodiments, can be implemented as a flag within the RTS/CTS frame, or any other node identifying information. The second MP node 12, after receiving the RTS/CTS frame, may begin communicating with another MP node, such as MP node 14, after the second MP node 12 confirms that it is not party to the beamformed data transmission between the first MP node 10 and AP node 20, and the second MP node confirms that both the second MP node 12 and the new MP node are not in the range of the beamformed transmission between first MP node 10 and AP node 20 (Block 34). The AP node 20 and first MP node 10 are capable of communicating simultaneously with one another while the second MP node 12 communicates with any other MP node (Block 36).

In one embodiment of the present disclosure, a component, such as the transceiver 30 and/or component 32, is used by a wireless MP node or an AP node in a mesh network. The component includes logic operable to send and receive broadcast communications and directed communications. Broadcast communications are those communications which are intended to be received by all wireless nodes within the range of the sender, and directed communications are communications intended for only a subset of members within the wireless network.

Figure 4:
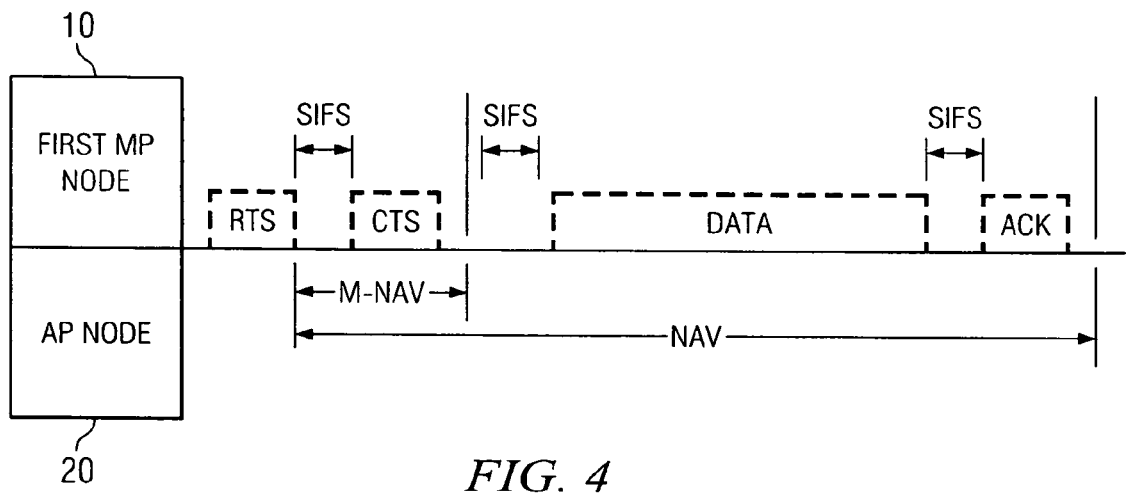
FIG. 4 is a graphical representation of the traffic between an access point node and a mesh point node as discussed in the flowchart of FIG. 3.

FIG. 4 is a graphical representation of the traffic between the AP node 20 and the MP node 10 as discussed in the flowchart of FIG. 3. The MP node 10 sends a broadcast RTS packet to AP node 20. AP node 20 then pauses using a short interframe space (SIFS), which is a small gap between two data frames, and then transmits a CTS packet. The beginning of the SIFS also signifies the beginning of the M-NAV data, which is sent to the MP node 10 by the AP node 20. After MP node 10 receives the broadcast CTS frame from the AP node 20, M-NAV data transmission ceases but the NAV data transmission continues. In this embodiment, the MP node initiates the sending of the packets. However, it is envisioned that either a MP node or an AP node can initiate communications consistent with this disclosure.

Beamforming is one method that can be coupled with the M-NAV information to make mesh networks more efficient. Beamforming is a well known signal processing technique using arrays of transmitters or receivers to control the directionality of, or sensitivity to, a signal pattern. When receiving a signal, beamforming can increase the gain in the direction of wanted signals and decrease the gain in the direction of interference and noise. Using beamforming, a transmission node can be thought of as directing a transmission toward an intended node such that the transmission is more readily perceived or heard by the intended node, while other, unintended nodes, do not hear or as readily perceive the transmission. Beamforming could cause the problem related to the hidden node since the unintended nodes may not hear some transmissions. However all nodes hear a broadcast portion of the message and all are then silent during the beamformed data portion of the message so as not to create conflicts, even though the unintended nodes may not hear the beamformed data portion of the message.

Figure 5:
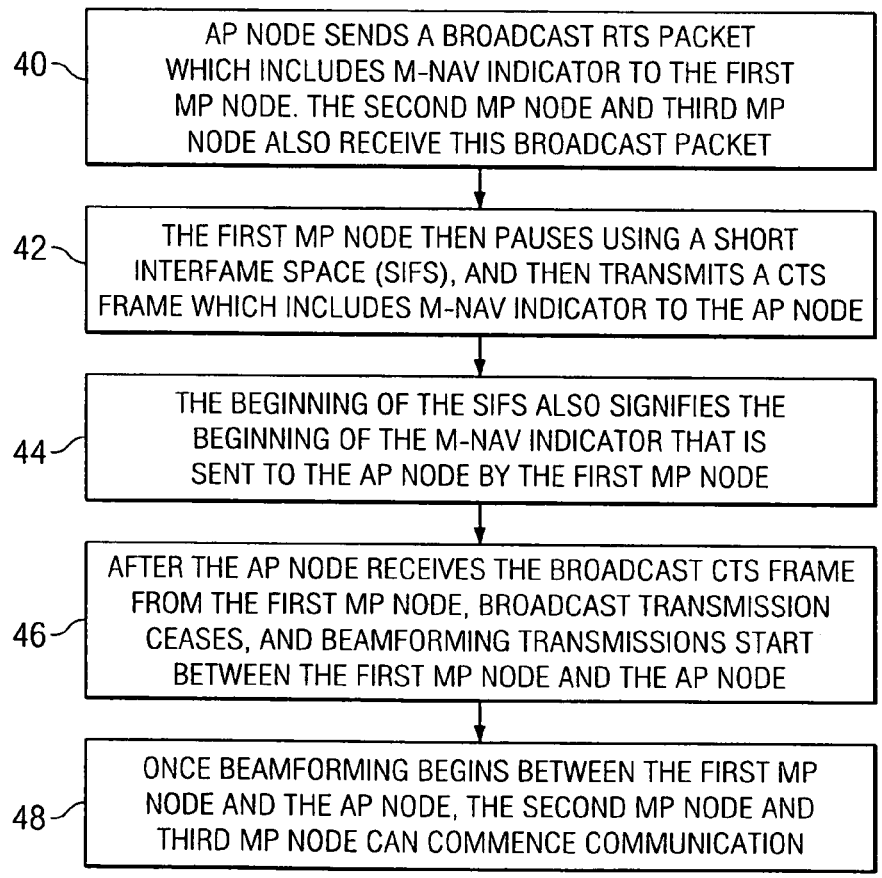
FIG. 5 is a flowchart of one example of the communication when beamforming is employed.

In one embodiment, the present disclosure combines the use of M-NAV data with beamforming to make communication within a mesh network more efficient. FIG. 5 is a flowchart of one example where beamforming is used. In this embodiment, an AP node 20 is within range of a first MP node 10, a second MP node 12, and a third MP node 14.

Figure 6:
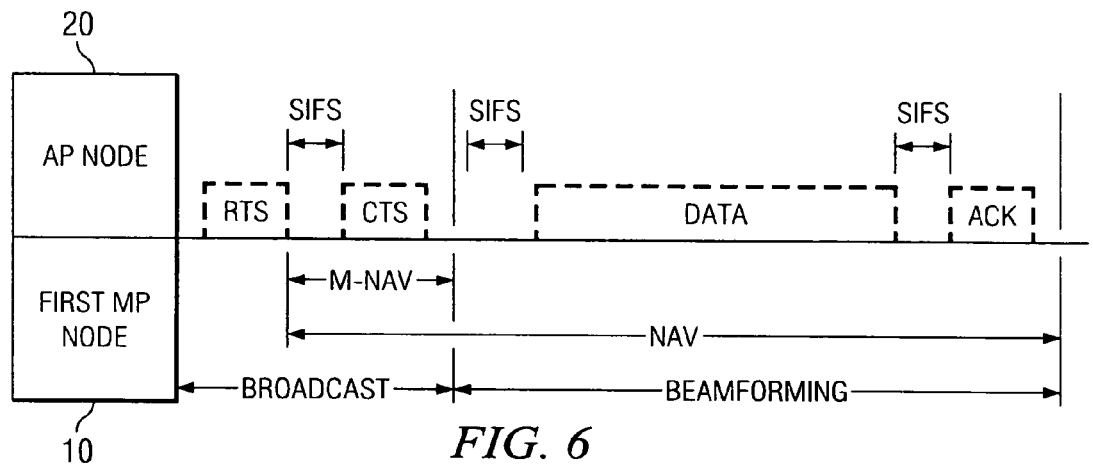
FIG. 6 is a graphical representation of one embodiment of the present disclosure.

In the embodiment shown in FIG. 5 and illustrated in FIG. 2, the AP node 20 sends a broadcast RTS packet to the first MP node 10. The second MP node 12 and third MP node 14 also receive this broadcast packet. (Block 40). First MP node 10 then pauses using a short interframe space (SIFS), which is a small gap between two data frames, and then transmits a CTS packet. (Block 42). The beginning of the SIFS also signifies the beginning of the M-NAV indicator that is sent to the AP node 20 by the first MP node 10. (Block 44) After AP node 20 receives the broadcast CTS frame from the first MP node 10, broadcast transmission ceases, and beamforming transmissions start between first MP node 10 and AP 20 (Block 46). Once beamforming begins between the first MP node 10 and the AP node 20, the second MP node 12 and third MP node 14 can commence communication (Block 48). FIG. 6 is a graphical representation of the communication between the AP node 20 and the first MP node 10. In this embodiment, the AP node initiates the sending of the packets. However, it is envisioned that either a MP node or an AP node can initiate communications consistent with this disclosure.

Figure 7:
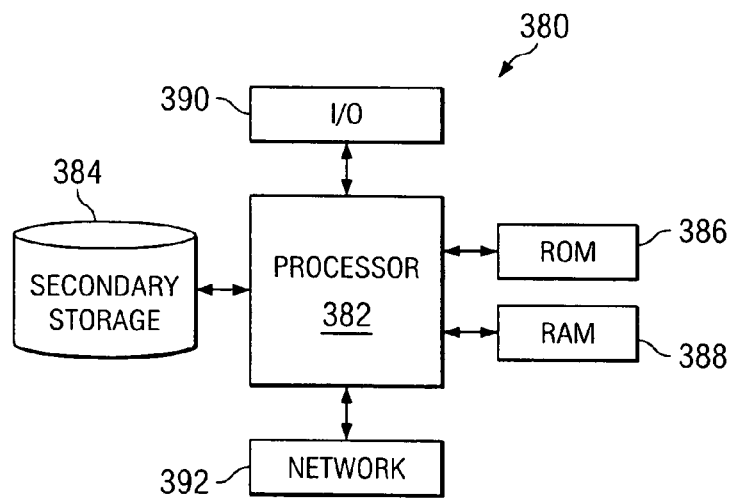
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein of either a MP node or an AP node. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A network node in a network having both mesh point nodes and access point nodes, comprising:
   a transceiver capable of beamforming transmissions and configured to communicate messages having a broadcast portion and a beamformed data portion, the broadcast portion including a Mesh Network Allocation Vector (M-NAV) information transmitted with request to send (RTS) broadcast messages and clear to send (CTS) broadcast messages, wherein the mesh network allocation vector indicates that a beamforming transmission is taking place and said M-NAV is used by a plurality of mesh point nodes as an indication that those mesh point nodes that are outside of a zone of beamforming can continue normal transmission; and a component configured to promote the transceiver being enabled for communication with other network nodes in response to the message including the M-NAV and the message being intended for a specific network node other than the network node, the component configured to promote the transceiver receiving the beamformed data portion of the message in response to the message including the M-NAV and the message being intended for the network node.

2. The network node of claim 1, wherein the transceiver only will transmit in broadcast mode when not sending or receiving data.

3. The network node of claim 1, wherein the network node is a mesh point node.

4. The network node of claim 1, wherein the network node is an access point node.

5. A method for communication in a wireless network having both mesh point nodes and access point nodes, comprising:
   a first node sending a broadcast portion of a message to communicate with a second node, the broadcast portion comprising a Mesh Network Allocation Vector (M-NAV) information transmitted with request to send (RTS) broadcast messages and clear to send (CTS) broadcast messages, wherein the mesh network allocation vector indicates that a beamforming transmission is taking place and is used;
   a third node receiving the broadcast portion of the message;
   transmitting a beamformed data portion of the message from the first node to the second node; and
   the third node communicating with another node in the wireless network during transmission of the beamformed data portion of the message between the first and second nodes.

6. The method of claim 5, wherein the wireless network is a mesh network.

7. The method of claim 5, wherein the broadcast portion also includes network allocation vector data.

8. The method of claim 5, wherein the first node is a mesh point node, and the second node is an access point node.

9. The method of claim 5, wherein the first, second, and third nodes are each selected from a group of nodes consisting of mesh points, access points, combination mesh/access points, computers, laptop computers, portable computers, servers, routers, mobile handsets, mobile stations.

* * * * *